United States Patent
Huber et al.

(10) Patent No.: US 10,787,278 B2
(45) Date of Patent: Sep. 29, 2020

(54) AIRCRAFT MAINTENANCE MESSAGE PREDICTION

(71) Applicant: THE BOEING COMPANY, Chicago, IL (US)

(72) Inventors: David J. Huber, Calabasas, CA (US); Nigel D. Stepp, Santa Monica, CA (US); Tsai-Ching Lu, Thousand Oaks, CA (US)

(73) Assignee: The Boeing Company, Chicago, IL (US)

(*) Notice: Subject to any disclaimer, the term of this patent is extended or adjusted under 35 U.S.C. 154(b) by 42 days.

(21) Appl. No.: 15/721,494

(22) Filed: Sep. 29, 2017

(65) Prior Publication Data
US 2019/0100335 A1 Apr. 4, 2019

(51) Int. Cl.
*B64F 5/40* (2017.01)
*G07C 5/00* (2006.01)
*G07C 5/08* (2006.01)
*G05B 23/02* (2006.01)

(52) U.S. Cl.
CPC ............ *B64F 5/40* (2017.01); *G05B 23/0221* (2013.01); *G07C 5/006* (2013.01); *G07C 5/008* (2013.01); *G07C 5/085* (2013.01); *G07C 5/0808* (2013.01)

(58) Field of Classification Search
CPC ...................................................... B64F 5/40
See application file for complete search history.

(56) References Cited

U.S. PATENT DOCUMENTS

| 4,943,919 | A | * | 7/1990 | Aslin | G07C 5/006 340/500 |
|---|---|---|---|---|---|
| 7,230,527 | B2 | | 6/2007 | Basu et al. | |
| 8,255,100 | B2 | | 8/2012 | Schimert | |
| 8,452,475 | B1 | * | 5/2013 | West | G07C 5/008 701/29.1 |
| 9,776,731 | B1 | | 10/2017 | Lieberman et al. | |
| 2003/0004619 | A1 | | 1/2003 | Carriker et al. | |
| 2006/0097584 | A1 | | 5/2006 | Morel | |
| 2006/0097854 | A1 | * | 5/2006 | Basu | G07C 5/006 340/425.5 |

(Continued)

OTHER PUBLICATIONS

"AIRMAN: Real-Time Aircraft Health Monitoring," Airbus, 2017, 1 page. http://www.airbus.com/innovation/proven-concepts/in-fleet-support/airman.

(Continued)

*Primary Examiner* — Nicholas K Wiltey
*Assistant Examiner* — Tiffany K Luu
(74) *Attorney, Agent, or Firm* — Yee & Associates, P.C.

(57) ABSTRACT

A method and apparatus for maintaining a vehicle, such as an aircraft. A plurality of maintenance messages generated during operation of the vehicle are stored to form a plurality of stored maintenance messages. The stored maintenance messages are filtered to remove from the stored maintenance messages those maintenance messages that are correlated to minimum equipment list actions to form filtered stored maintenance messages. A predicted maintenance message is generated from the filtered stored maintenance messages by applying a machine learning algorithm to the filtered stored maintenance messages. The predicted maintenance message may be used to perform a maintenance operation on the vehicle.

20 Claims, 8 Drawing Sheets

(56) References Cited

U.S. PATENT DOCUMENTS

| | | | | |
|---|---|---|---|---|
| 2007/0260726 | A1* | 11/2007 | Rozak | G06Q 10/06 709/224 |
| 2008/0040152 | A1* | 2/2008 | Vian | G05B 23/0221 705/2 |
| 2009/0228160 | A1* | 9/2009 | Eklund | G06F 11/008 701/3 |
| 2010/0241293 | A1 | 9/2010 | Ganguli et al. | |
| 2011/0196881 | A1* | 8/2011 | Deleris | G01C 23/00 707/752 |
| 2013/0274992 | A1* | 10/2013 | Cheriere | B64F 5/40 701/32.9 |
| 2015/0039177 | A1* | 2/2015 | Chapman | G06F 16/248 701/31.6 |
| 2015/0039551 | A1 | 2/2015 | Huet et al. | |
| 2015/0134244 | A1* | 5/2015 | Hershey | G01C 21/3617 701/489 |
| 2019/0102957 | A1 | 4/2019 | Huber et al. | |

OTHER PUBLICATIONS

Breiman, "Random Forests," Statistics Department, University of California, Berkeley, California, Jan. 2001, pp. 1-33.

Fix, et al., "Discriminatory analysis, Nonparametric discrimination: Consistency properties," Project No. 21-49-004, Technical Report 4, USAF School of Aviation Medicine, Randolph Field, Texas, Feb. 1951, 24 pages.

Fortes, et al., "Support-vector networks," AT & T Bell Labs, Machine Learning, 1195, pp. 273-297.

Ihaka, et al., "R: A Language for Data Analysis and Graphics," Journal of computational and graphical statistics, vol. 5, No. 3, 1996, pp. 299-314.

Peterson, "K-nearest neighbor," Scholarpedia, vol. 4, No. 2, 1883, http://www.scholarpedia.org/article/K-nearest_neighbor, accessed Jun. 2, 2017, 14 pages.

"ATA 100," Wikipedia, http://en.wikipedia.org/wiki/ATA_100, accessed Sep. 29, 2017, 18 pages.

"Line Graph," Wikipedia, https://en.wikipedia.org/wiki/Line_graph, accessed Sep. 29, 2017, 13 pages.

European Patent Office Communication and Extended Search Report, dated Mar. 1, 2019, regarding Application No. 18195759.8, 9 pages.

Bartolini et al., "An Application of Diagnostic Inference Modeling to Vehicle Health Management", 2001 IEEE Autotestcon Proceedings, IEEE Systems Readiness Technology Conference, Autotestcon 2001, Aug. 20-23, 2001, 12 pages.

Office Action, dated Aug. 29, 2019, regarding U.S. Appl. No. 15/721,533, 15 pages.

* cited by examiner

| 302 | 304 | 306 | 308 | 310 | 312 | 314 | 316 | 318 |
|---|---|---|---|---|---|---|---|---|
| AIRLINE | TAIL NUM | LEG NUM | MMSG CODE | MMSG ACTIVITY CODE | MMSG INT NUM | FDE CODE | FDE ACTIVITY CODE | FDE TYPE |
| XYZ | A | 1 | MMSG-1 | I | 0 | NULL | NULL | NULL |
| XYZ | A | 1 | MMSG-1 | A | 0 | FDE-1 | I | CAUTION |
| XYZ | A | 2 | MMSG-2 | L | 1 | FDE-1 | A | WARNING |
| XYZ | A | 3 | MMSG-3 | I | 2 | NULL | NULL | NULL |
| XYZ | B | 1 | MMSG-3 | A | 2 | FDE-3 | I | ADVISORY |
| XYZ | B | 2 | MMSG-2 | L | 0 | FDE-2 | A | WARNING |

AIRCRAFT MAINTENANCE MESSAGE PREDICTION

BACKGROUND INFORMATION

1. Field

The present disclosure relates generally to operating and maintaining aircraft and other vehicles. More particularly, the present disclosure relates to predicting when maintenance of an aircraft or other vehicle may be needed, so as to perform a maintenance operation on the aircraft or other vehicle.

2. Background

Known aircraft maintenance systems attempt early detection of undesired conditions on an aircraft by performing constant monitoring of the aircraft and advising the operator of the aircraft if a fault or warning message is detected. The objective of such a system is to reduce aircraft downtime by notifying maintenance crews on the ground of necessary work prior to the next flight. This allows maintenance personnel to get a head start on preparing to perform maintenance operations on the aircraft, including obtaining the proper parts and taking other appropriate preparatory actions. Such a system may perform fault correlation and may identify recurring faults. This has been described by maintenance crews as a "pressure release effect" because notifications from the system allow maintenance personnel to prepare for a repair prior to the aircraft's arrival, freeing up valuable ground time.

Other known systems attempt to predict flight deck effects on aircraft. Such a system may monitor parameters associated with systems onboard an aircraft and determine when the parameters have deviated from a nominal range in indication of an impending undesired condition. Such a system also may perform statistical analysis of the aircraft system parameters and may trigger a warning in anticipation of a flight deck effect.

Known systems and methods for predicting undesired conditions in aircraft may not provide such predictions as much in advance of the occurrence of the undesired condition as desired. Known systems and methods for predicting undesired conditions in aircraft may not predict the occurrence of such undesired conditions as accurately as desired.

Therefore, there may be a need for a method and apparatus that take into account at least some of the issues discussed above, as well as other possible issues.

SUMMARY

In one illustrative embodiment, a method of maintaining an aircraft comprises storing a plurality of maintenance messages generated during a plurality of legs of flights of the aircraft to form a plurality of stored maintenance messages. A predicted maintenance message is generated from the plurality of stored maintenance messages. The predicted maintenance message is used to perform a maintenance operation on the aircraft.

In another illustrative embodiment, a method of maintaining a vehicle comprises storing a plurality of maintenance messages generated during operation of the vehicle to form a plurality of stored maintenance messages. The plurality of stored maintenance messages are filtered to remove from the stored maintenance messages those maintenance messages that are correlated to minimum equipment list actions to form filtered stored maintenance messages. A predicted maintenance message from the filtered stored maintenance messages is generated by applying a machine learning algorithm to the filtered stored maintenance messages. The predicted maintenance message is used to perform a maintenance operation on the vehicle.

In yet another illustrative embodiment, an apparatus comprises a real-time event storer, a maintenance message predictor, and a predicted maintenance message deliverer. The real-time event storer is configured to store a plurality of maintenance messages generated during operation of a vehicle to form a plurality of stored maintenance messages. The maintenance message predictor is configured to generate a predicted maintenance message from the plurality of stored maintenance messages. The predicted maintenance message deliverer is configured to send the predicted maintenance message to maintenance personnel for use by the maintenance personnel to perform a maintenance operation on the vehicle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
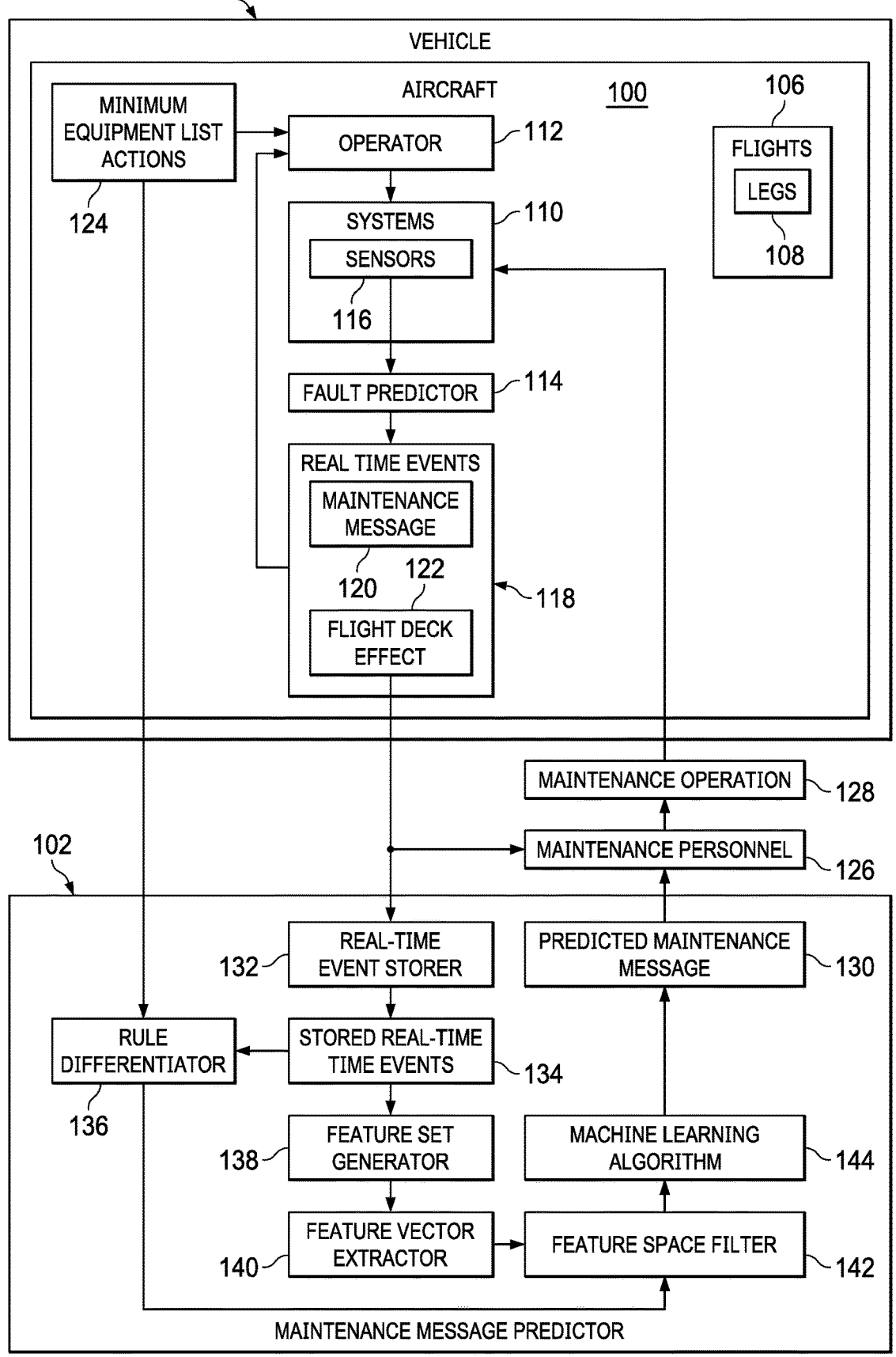
FIG. 1 is an illustration of a block diagram of an aircraft and a maintenance message predictor in accordance with an illustrative embodiment.

The illustrative embodiments recognize and take into account different considerations. For example, illustrative embodiments recognize and take into account that a disadvantage of current systems and methods that attempt early detection and notification of undesired conditions on aircraft is that such systems and methods may not provide sufficiently early warning of a predicted undesired condition. For example, such current systems and methods may not provide more than a single leg of warning prior to the onset of an undesired condition. Current systems and methods may provide ground crews with some advanced notice of an undesired condition on an aircraft, so that maintenance personnel may begin to prepare a solution prior to the arrival of the aircraft. However, current systems and methods may not provide a longer-term warning that would allow a more flexible approach to responding to predicted undesired conditions on an aircraft, such as substitution of aircraft, rerouting to a better repair location, or other appropriate responses. These systems focus on real-time operation of parameters on the aircraft and only employ very recent data in performing analysis in a manner that is similar to the "check engine" light on an automobile, in that the notification is provided when the occurrence of an undesired condition is imminent, rather than days prior. While this process is proactive, it does not allow the flexibility of response that the disclosed invention does.

For example, one known system communicates with ground crews about potential required maintenance actions while the aircraft is still in the air. This provides time for the ground crew to prepare personnel and equipment to begin the maintenance, but it does not allow for actual planning of the maintenance, for example, at another time or location, because the time scale is too short. Another known system follows a similar procedure, in which the system issues an alert for a potential warning when the real-time reading and statistical analysis of aircraft sensor data indicates that the measured parameters have strayed beyond what is considered "nominal." This method does not involve the history of the sensor data over several flight legs, nor does it provide several legs of advance notice prior to the actual flight deck effect.

The illustrative embodiments thus recognize and take into account that current aircraft health management systems monitor aircraft system parameters in real time, requiring that the focus be placed on current or very recent events, rather than employing a historical record. In contrast, the illustrative embodiments employ maintenance message and flight deck effect data from several flight legs ago to the current leg, providing a long history to draw from when making predictions about the future health of the aircraft. By focusing on higher-level signals rather than direct measurements from subsystems, a longer history can be monitored to probe deeper into the future than would be possible with higher-resolution signals.

Furthermore, illustrative embodiments recognize that maintenance messages, either uncorrelated or linked to a flight deck effect, can be used to predict the future occurrences of other maintenance messages. While other systems attempt to directly predict the occurrence of an error based on the measurable system parameters, illustrative embodiments look for patterns of errors in maintenance messages and flight deck effects that would allow the prediction of future real time events.

The illustrative embodiments disclosed herein provide aircraft operators and maintenance crews multiple legs, for example, up to possibly several days, of lead time prior to the onset of a critical event. This capability opens up more flexible fleet management options, such as allowing the substitution of other aircraft or rerouting the aircraft to a more capable location for maintenance to be performed.

Illustrative embodiments may provide maintenance crews increased time to react to a potential fault. For example, illustrative embodiments may predict faults several flight legs (for example, up to several days) in advance of the occurrence of actual undesired conditions. This benefit of earlier prediction of undesired conditions may not be achieved purely with sensor data collected over the immediate past. Therefore, illustrative embodiments may leverage maintenance messages and flight deck effects for the previous twenty or more flights to make predictions for five to ten flight legs into the future.

Turning to FIG. 1, an illustration of a block diagram of an aircraft and a maintenance message predictor is depicted in accordance with an illustrative embodiment. Aircraft 100 may include any appropriate type of aircraft. For example, without limitation, aircraft 100 may comprise a commercial passenger aircraft. In accordance with an illustrative embodiment, maintenance message predictor 102 is configured to predict when undesired conditions may occur in aircraft 100, so that maintenance operations may be performed on aircraft 100 before such undesired conditions occur.

Aircraft 100 is an example of vehicle 104 in which illustrative embodiment may be implemented. Illustrative embodiments may be implemented in vehicle 104 other than aircraft 100 to improve the maintenance of vehicle 104. For example, without limitation, vehicle 104 may comprise a land vehicle, a water vehicle, or a space vehicle.

Aircraft 100 may be operated to perform a number of flights 106. Each of the number of flights 106 may comprise a number of legs 108.

Aircraft 100 may comprise systems 110. Systems 110 may be controlled by operator 112 to control the operation of vehicle 104. For example, operator 112 may comprise a human operator, a computer implemented operator, or a human operator in combination with a computer.

Fault predictor 114 may be implemented on aircraft 100 to predict when a fault is likely to occur in systems 110. Fault predictor 114 may use real-time information provided by sensors 116 implemented in systems 110. Sensors 116 may be configured to monitor various conditions in systems 110 in real-time. Fault predictor 114 may be configured to indicate the prediction of a fault when the monitored conditions of systems 110 deviate from desired conditions of systems 110 by more than a selected amount.

A predicted fault generated by fault predictor 114 may be provided in the form of real-time events 118. Real-time events 118 may include maintenance message 120. Real-time events 118 also may include flight deck effect 122.

Real-time events 118 may be provided to operator 112 and maintenance personnel 126 so that appropriate action may be taken. For example, maintenance personnel 126 may perform maintenance operation 128 on systems 110. In some cases, operator 112 may perform minimum equipment list actions 124 in response to real-time events 118.

In accordance with an illustrative embodiment, maintenance message predictor 102 may comprise real-time event storer 132 which may be configured to store real-time events 118 from a plurality of legs 108 of flights 106 of aircraft 100. Stored real-time events 134 may be processed by rule differentiator 136, feature set generator 138, feature vector extractor 140, feature space filter 142, and machine learning algorithm 144 to generate predicted maintenance message 130. The functions performed by rule differentiator 136, feature set generator 138, feature vector extractor 140, feature space filter 142, and machine learning algorithm 144 will be described in more detail below.

Predicted maintenance message 130 may be provided to maintenance personnel 126 for performing maintenance operation 128 on aircraft 100. Maintenance operation 128 may comprise proactive or preventative maintenance. Maintenance operation 128 may include logistics support for performing maintenance on an aircraft. For example, without limitation, maintenance operation 128 may comprise readying a part or maintenance equipment for performing maintenance on an aircraft.

Undesirable mechanical and electrical conditions in aircraft are indicated by real-time events (RTEs), which are composed of two parts: a maintenance message (MMSG), and a flight deck effect (FDE). A given RTE is identified by the code of the MMSG and FDE that compose it. Each MMSG is indicated by a seven-digit code that declares which system has experienced the mechanical fault and is particularly useful to maintenance crews on the ground. While every FDE must correspond to a single MMSG, the converse is not true; MMSGs can and do occur without an accompanying FDE. These MMSGs that occur without an FDE are called uncorrelated MMSGs and are not considered to be RTEs. They are, however, potential indicators of future RTEs.

However, not every RTE is caused by faults in the aircraft. The employment of minimum equipment list (MEL) remedies may also induce or be induced by various RTEs based on how they are implemented. Put simply, a MEL is a work-around for a maintenance problem that must eventually be addressed, but can be postponed by performing other tasks that are specifically outlined in the MEL document. For example, if a noncritical system experiences a fault, the MEL recommendation might be to cut power from that system until it can be repaired. This protects the system from further damage from use and provides the air crew with a basic understanding of how the aircraft should operate by removing a variable, an unknown amount of further system degradation while in flight, and replacing it with a known quantity, the system shutdown. The act of executing the MEL may lead to other MMSGs that are related to the work-around (for example, "no power to X system" messages), which show strong correlation/causation between the original fault and the message that occurs as the result of the MEL. Additionally, the MEL may be caused by an MMSG, which in turn leads to additional MMSGs, correlating the original fault MMSG with the new MEL-related MMSG. This leads to trivial forecasts of MMSGs by a prediction algorithm that could have been predicted solely on the knowledge of the MEL. Importantly these MEL-induced signals distract the machine learning algorithm, upon which the predictor is based, from more subtle cues that might accurately predict unexpected faults. Therefore, features that might be caused by MELs should be removed from the feature space so that the machine learning algorithms do not train on them.

The illustration of maintenance message predictor 102 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

The fault data that the system processes consists of a series of text files stored on the computer hard disk, each corresponding to a given time frame for a specific airline. Each line of the text corresponds to a single fault, which is defined as an instance of a maintenance message (MMSG), which may or may not be correlated to a flight deck effect (FDE). In addition to the numeric codes for the MMSG and FDE, each line of data must also contain the aircraft identifier ("Tail Num"), a numeric identifier for the flight leg ("Leg Num"), and the "state" of the fault: the MMSG and FDE activity codes, the FDE activity type, and the intermittence of the MMSG. If the leg number is not available, it may be inferred from the flight date and time via a preprocessing step. Some flight legs may have many entries in the fault data, caused by multiple fault messages during the leg. In rare circumstances, some flight legs may not have any fault information at all.

Each maintenance message (MMSG) and flight deck effect (FDE) has additional modifiers that indicate their severity. When the modifiers of the MMSG and FDE for a given RTE are taken as a whole, this is called the "state" of the RTE. Both MMSGs and FDEs have "Activity Codes", while MMSGs have "Intermittence Numbers" and FDEs have "Types". The state of an RTE is the combination of these four attributes. Both maintenance messages and flight deck effects are found with three different "Activity Codes": "inactive" (I), "active" (A), or "latched" (L). The MMSG or FDE type is an indicator of the severity of the fault, where "inactive" is less severe than "active" or "latched", which are both more severe. The MMSG and FDE Activity Codes may be used to predict future states of a given RTE, making them important in this system. For example, a given MMSG or FDE may appear in the "inactive" state several times prior to becoming "active" or "latched". In this case, the relatively benign "inactive" instance may be used to predict the more severe versions of the fault. When an active or latched MMSG combines with an active or latched FDE in an RTE, the plane is grounded until the problem is resolved. The "Intermittence Number" of a given MMSG indicates how many times during the leg the fault message (either RTE or uncorrelated MMSG) has been reissued after the original fault message was displayed. An intermittence value of zero indicates that the fault message only appeared once, whereas nonzero values indicate the number of times the message reappeared. A higher issuance of a warning may be indicative of an undesired condition that may be of greater concern than when the warning is only issued once.

Additionally, flight deck effects have a feature called an "FDE Type", which is a type of descriptor for the FDE that indicates the nature of the mechanical fault to the flight crew. There are many common FDE Types, the most common of which are "STATUS", "WARNING", "CAUTION", and "ADVISORY". However, there are also some less-common FDE Types that can exist (e.g., "SNAPSHOT"). Like with the MMSG and FDE activity codes, seemingly benign MMSG and FDE Types may eventually evolve into more significant issues. For RTE prediction, the "WARNING", "CAUTION", and "ADVISORY" types are the most relevant for prediction, since they can potentially ground an aircraft in the right configuration. Other FDE types may or may not be good predictors of future undesired conditions.

During normal aircraft operation, several types of data are collected. For instance, maintenance messages (MMSG) are generated under certain anomalous conditions. Whether or not these messages signify a problem often depends on details of the aircraft configuration. A flight may continue with inoperable, missing, or disabled equipment according to the Master Minimum Equipment List. In such a situation, an aircraft with a malfunctioning part may be issued a Minimum Equipment List (MEL) which allows for the part to remain inoperable, missing, or disabled. Inoperable, missing, or disabled equipment typically appears anomalous and causes MMSGs to be issued erroneously. Because of complex connections between aircraft systems, the MMSGs generated might not be directly related to the MEL part. As such, there is a need to identify which MMSGs are related to MEL parts.

Figures 2, 3:
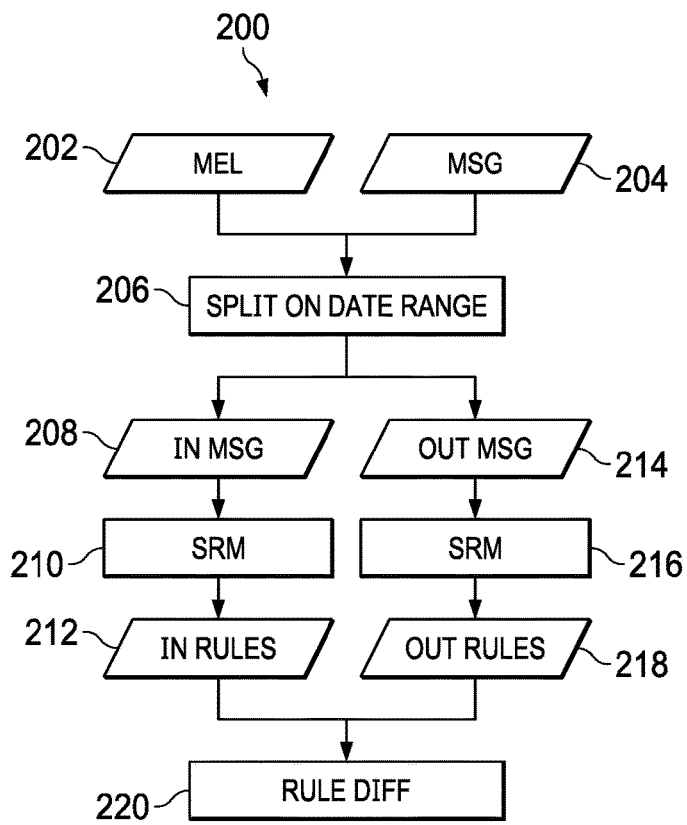
FIG. 2 is an illustration of a flow diagram of a rule differentiation procedure for identifying maintenance messages that are highly correlated with minimum equipment list actions in accordance with an illustrative embodiment.
FIG. 3 is an illustration of an example of an input data format for a maintenance message predictor in accordance with an illustrative embodiment.

Turning to FIG. 2, an illustration of a flow diagram of a rule differentiation procedure 200 for identifying maintenance messages that are highly correlated with minimum equipment list actions is depicted in accordance with an illustrative embodiment.

A particular MEL, identified by a 6-digit code, is active over a range of time. During this time, the aforementioned erroneous MMSGs will be generated. In order to identify which of the MMSGs are related to the MEL part, the MMSGs are split into two disjoint sets: ones occurring during the MEL and ones occurring outside of the MEL. Existing association rule mining techniques are used on each set to generate two sets of association rules. The challenge is to discover how the rules in the two sets differ from one another. Comparison of sets follows a two-step process: 1) identification of rules in different sets that are most similar to each other, and 2) creating difference rules that encapsulate how rules from one set differ from rules in another.

A rule is made up of two sets, one each for antecedent and consequent. A well-known statistic for measuring the similarity of two sets is the Jaccard Index. For sets A and B, the Jaccard Index J(A,B) is defined by the ratio of the size of the set intersection to the size of the set union.

$$J(A, B) = \frac{|A \cap B|}{|A \cap B|}$$

To determine rule similarities among $R_{in}$ and $R_{out}$, two similarity matrices are defined. The first is the similarity matrix for rule antecedents.

$$R_{in}^{ant} = \{A | A \Rightarrow B \in R_{in}\}$$

$$R_{out}^{ant} = \{A | A \Rightarrow B \in R_{out}\}$$

$$S_{ij}^{ant} = J(r_i, r_j) \forall r_i \in R_{in}^{ant}, r_j \in R_{out}^{ant}$$

The matrix $S_{ij}^{ant}$ contains similarities for each pair of rule antecedents taken from the in-range and out-of-range maintenance message association rules.

For each in-range antecedent, the set of maximum similarity out-of-range antecedents is given by:

$$M_i^{ant} = \{r_j | S_{ij}^{ant} = \max(S_i^{ant})\}.$$

To find the set of maximum similarity rules, each rule with maximum similarity antecedents is checked for similarity among consequents. The process is the same as for antecedents, but with restricted domain.

$$R_i^{cons} = \{B | A \Rightarrow B \in R_{out} \land A \in M_i^{ant}\}$$

$$S_j^{cons} = J(r_i, r_j) \forall r_j \in R_i^{cons}$$

$$M_i^{cons} = \{r_j | S_j^{cons} = \max(S^{cons})\}$$

where $r_i$ is the consequent for rule i. The set of maximum similarity consequents then also gives the set of maximum similarity rules M.

$$M_i = \{A \Rightarrow B | A \Rightarrow B \in R_{out} \land A \in M_i^{ant} \land B \in M_i^{cons}\}$$

With a sufficiently restrictive rule mining algorithm that does not produce many redundant rules, the cardinality of maximum similarity rule sets should be low, ideally singletons. Separately, there are two other sets of important rules. Rules from the in-range set that have no similarity to rules from the out-of-range set, and rules from the out-of-range set that have no similarity to rules from the in-range set. These represent "new" and "deleted" rules, respectively.

Given two rules that have been determined to be similar, the meaningful elements of their difference may be captured by introducing a structured difference rule. For rules $A \Rightarrow B$ and $C \Rightarrow D$, their difference rule is given by:

RuleDif $f(A \Rightarrow B, C \Rightarrow D) := (A \cap C, A \setminus C, C \setminus A) \Rightarrow (B \cap D, B \setminus D, D \setminus B),$ which is a rule between tuples of sets. Each tuple contains a set intersection and two set complements corresponding to positive and negative differences. The rule syntax is kept for convenience, but the semantics no longer apply in the same way. Instead, the rule is read as if two sets of antecedents have such an intersection and complements, then consequents will have such an intersection and complements.

A high-level process for creating rule differentiation in this situation is diagramed in FIG. 2. A single issued MEL 202 is active for a range of dates. The database of maintenance messages 204 is split using this range (operation 206). Operation 206 results in a set of maintenance messages 208 that are in the range of dates for MEL 202 and a set of maintenance messages 214 that are outside of the range of dates of MEL 202. Sequential rule mining is performed on set of maintenance messages 208 that are in the range of dates for MEL 202 (operation 210), resulting in a first set of rules 212, referred to herein as "in rules". Sequential rule mining is performed on set of maintenance messages 214 that are outside of the range of dates for MEL 202 (operation 216), resulting in a second set of rules 218, referred to herein as "out rules". The rule differentiation procedure described above may then be used to compare first set of rules 212 and second set of rules 218 (operation 220), with the process terminating thereafter. Maintenance personnel, knowing which MEL have been issued for a particular aircraft on a particular flight, may use the output of this process to determine which MMSGs are likely spurious.

Turning to FIG. 3, an illustration of an example of an input data format for a maintenance message predictor is depicted in accordance with an illustrative embodiment. Input data format 300 may be an example of one implementation of a data format for data identifying real time events 118 that may be provided to maintenance message predictor 102 in FIG. 1. For example, without limitation, each line in data format 300 may correspond to either an RTE, consisting of an MMSG and FDE pair, or an uncorrelated MMSG, which lacks an FDE.

Each line in data format 300 may identify the aircraft and time of occurrence of the real time event or uncorrelated maintenance message 308 by airline 302, tail number 304, and leg number 306. Maintenance message activity code 310, maintenance message intermittence number 312, flight deck effect code 314, flight deck effect activity code 316, and flight deck effect type 318 encodes the "state" of the real time event or uncorrelated maintenance message, which is both a descriptor and an indicator of its severity.

MMSGs and FDEs may be designated by a numeric code. An MMSG and FDE combined into an RTE may be represented, for example, without limitation, by linking those numeric codes with a colon (":"). For example, an RTE composed of the MMSG code "23-69931" and FDE code "221-313-00" is expressed as "23-69931:221-313-00". The system represents uncorrelated MMSGs with the FDE field set to "NULL" (i.e., "23-69931:NULL"). The system defines the "state" of the fault message as the union of the "Message Activity Code" and "Intermittence #" fields for the maintenance message and the "FDE Type" and "FDE Activity Code" fields for the FDE, which is expressed as "Mact.Mint:Ftype.Fact", where "Mact" is the "MMSG Activity Code", "Mint" is the "MMSG Intermittence Number", "Ftype" is the "FDE Type", and "Fact" is the "FDE Activity Code". The aircraft identifier ("Tail Num") and flight leg number are also extracted from each line of data for feature extraction.

Figure 4:
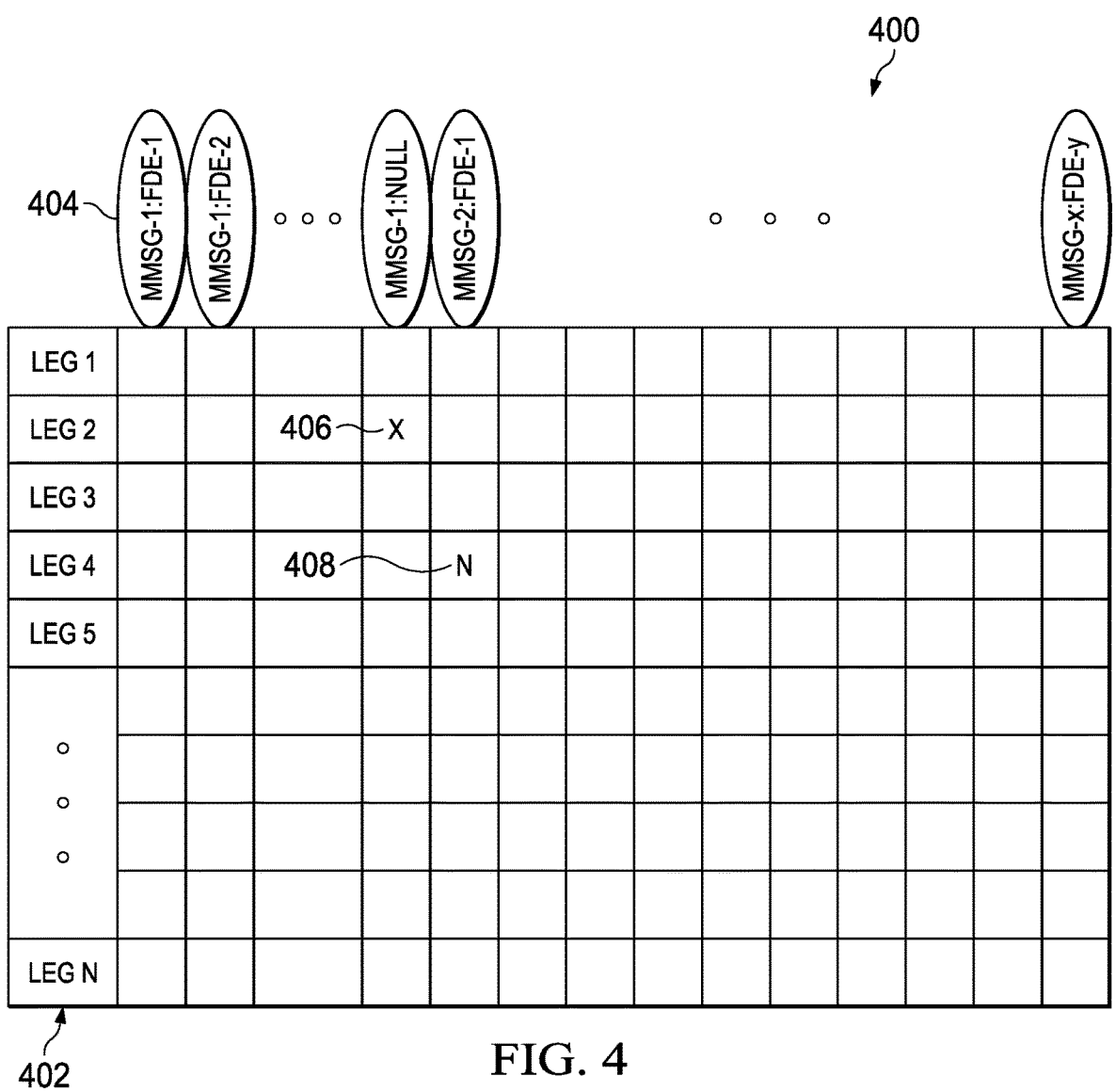
FIG. 4 is an illustration of an example of a feature table for a single aircraft for a maintenance message predictor in accordance with an illustrative embodiment.

Turning to FIG. 4, an illustration of an example of a feature table for a single aircraft for a maintenance message predictor is depicted in accordance with an illustrative embodiment. The largest step of operation is the construction of a feature space from the preprocessed aircraft fault data, which will eventually be used by a machine learning algorithm to train an ensemble of classifiers corresponding to the set of target RTEs at different prediction horizons. This procedure involves arranging the fault data into a flexible format from which a set of feature vectors for each RTE and prediction horizon can be extracted.

To organize the fault data in memory, the system first creates a table for each aircraft that correlates the occurrence of each RTE and uncorrelated MMSG with its state and the flight leg in which it occurred. At this stage, the records for different aircraft are kept separate because they likely contain differing numbers of flight legs.

Feature table 400 is an example of such a table for a single aircraft. Each row 402 in table 400 corresponds to a leg number for the aircraft. Each column 404 in table 400 corresponds to either an RTE or an uncorrelated MMSG, which will be used as features in the classifier.

To generate the list of column labels, the fault data across all aircraft is analyzed and an exhaustive list of every RTE and uncorrelated MMSG that occurs is accumulated. This list may be further pruned for a specific real-time event to be predicted by using loadable diagnostic information. Loadable diagnostic information is determined by engineering knowledge and indicates the set of real-time events that can be causally related to a target real-time event through the systems of an aircraft. By combining the RTE and uncorrelated MMSG sets across all tails to generate the column list, it is possible to combine the data from all aircraft into a single feature set.

Rows 402 in table 400 correspond to flight legs and represent the passage of time. Even though the preprocessing step may have left some flight legs without any fault data, the flight leg numbering in the table is contiguous and those rows without data will be left blank in the final output. To generate the list of row labels, for example, without limitation, the maximum leg number found in the data for each aircraft may be used and rows 402 numbered from 1 to the maximum leg number.

For example, without limitation, each cell in table 400 may be initialized with a label which indicates "no fault". For example, without limitation, each cell in table 400 may be initialized with the label "N" 408. This label will be overwritten as the fault data is parsed and the table is loaded.

To populate feature table 400 for each aircraft, the fault message from each row of the preprocessed fault data is assigned to the appropriate cell in table 400. Rows 402 and columns 404 of feature table 400 are defined by the flight leg number and the combination of the "MMSG Code" and "FDE Code" fields, respectively. The contents of this cell are assigned the "state" of the fault as defined by the combination of the "MMSG Activity Code", "Intermittence Number", "FDE Type", and "FDE Activity Code" in the aforementioned "Mact.Mint:Ftype.Fact" format. This state information is indicated by the label "X" 406 in table 400. All cells that do not contain any fault data remain labeled with "N" 408 as a placeholder.

Figure 5:
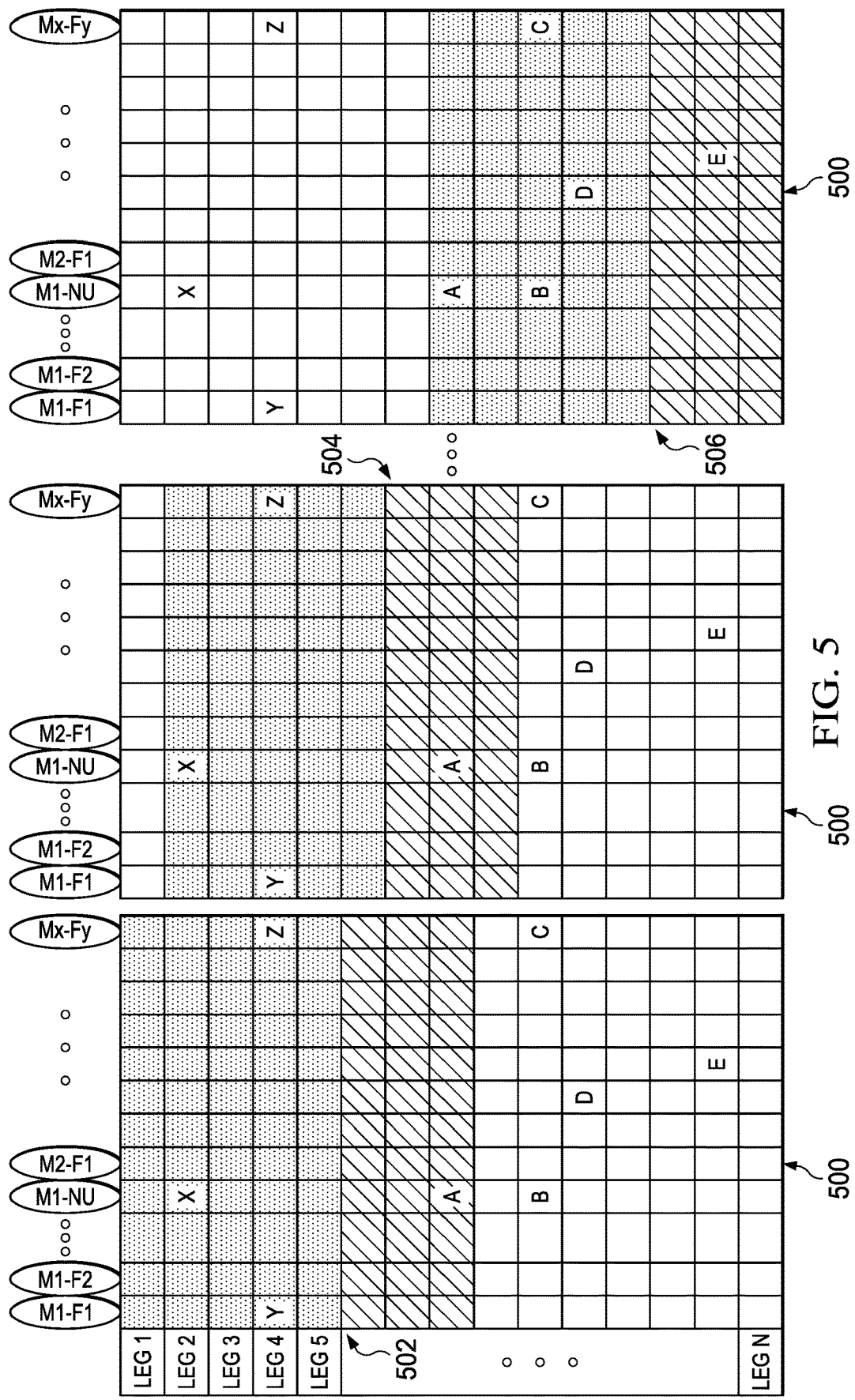
FIG. 5 is an illustration of an example of a process for applying a sliding window to a feature table in accordance with an illustrative embodiment.

Turning to FIG. 5, an illustration of an example of a process for applying a sliding window to a feature table is depicted in accordance with an illustrative embodiment. After the system generates and populates the feature table for each aircraft, it extracts a series of identically-sized windows that represent the recent history and immediate future at an arbitrary "current" time that will be the reference point of a prediction. For example, for feature table 500 for a particular aircraft, such identically sized windows 502, 504, and 506 are shown in shading and cross-hatching for different time periods. The shaded portion of windows 502, 504, and 506 represents the recent history relative to the "current" time. The cross-hatched portion of windows 502, 504, and 506 represents the immediate future relative to the "current" time.

To perform the windowing operation, two terms are defined: the feature leg window (FLW) and the target leg window (TLW). The feature leg window is defined as the L most recent legs relative to a given "current" time. The width of this window corresponds to how far back in time the machine learning algorithm is to look for feature events. For example, without limitation, the width of the window may be 20 legs, or any other appropriate number of legs. The target leg window corresponds to how far forward in time predictions are to be made. The TLW may generally be smaller than the FLW and corresponds to the range of future predictions that are to be made (for example, one leg ahead of "current", two legs ahead of "current", etc.), and therefore looks ahead of a given "current" time.

Figure 6:
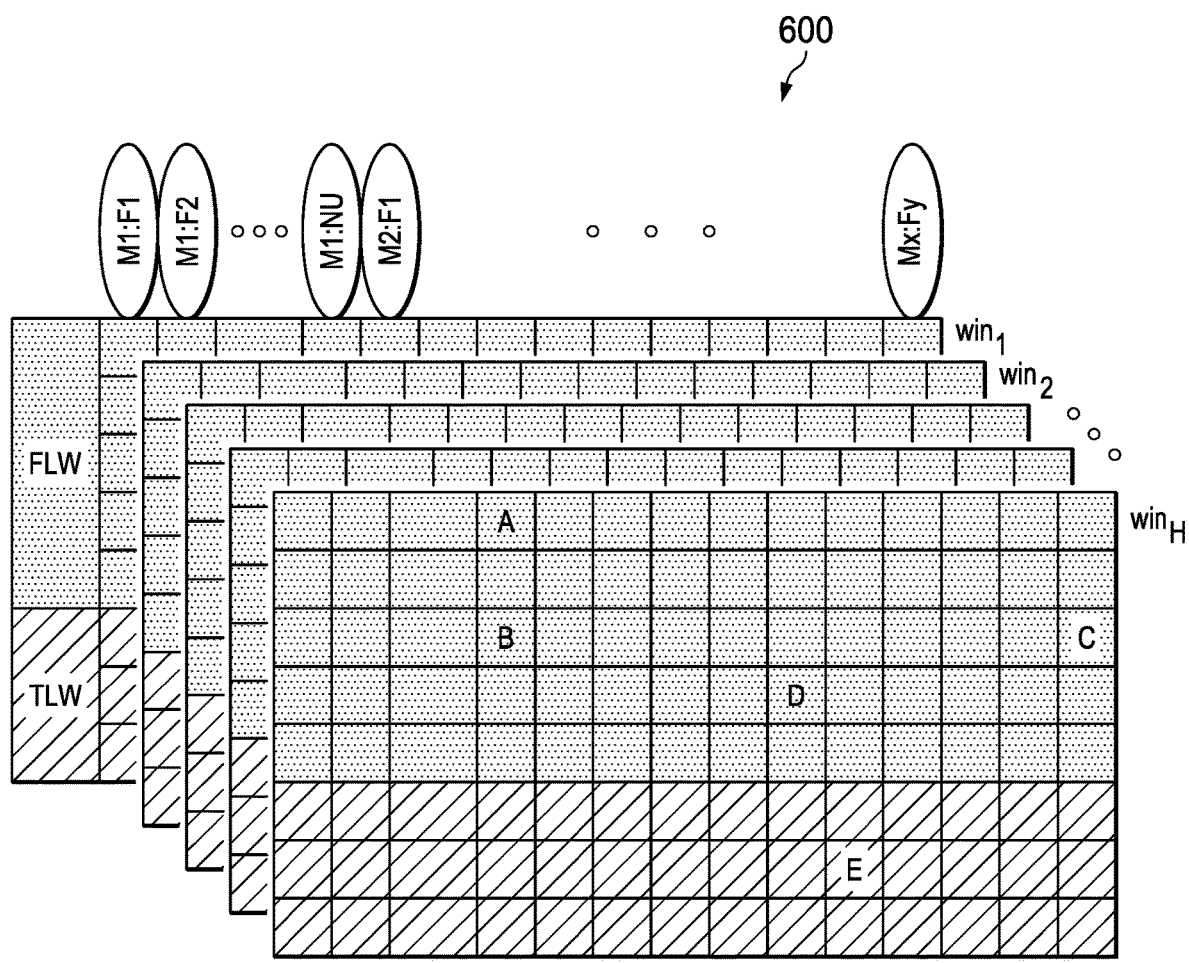
FIG. 6 is an illustration of an example of a feature window cube for a single aircraft in accordance with an illustrative embodiment.

Turning to FIG. 6, an illustration of an example of a feature window cube for a single aircraft is depicted in accordance with an illustrative embodiment. Feature window cube 600 for each aircraft is an example of a single "capture" from the windowing step. The number of rows in feature window cube 600 are equal to the FLW and TLW combined and columns corresponding to the number of columns in the feature table. The number of layers in the cube, H, corresponds to the number of windows that were extracted from the feature table.

Figure 7:
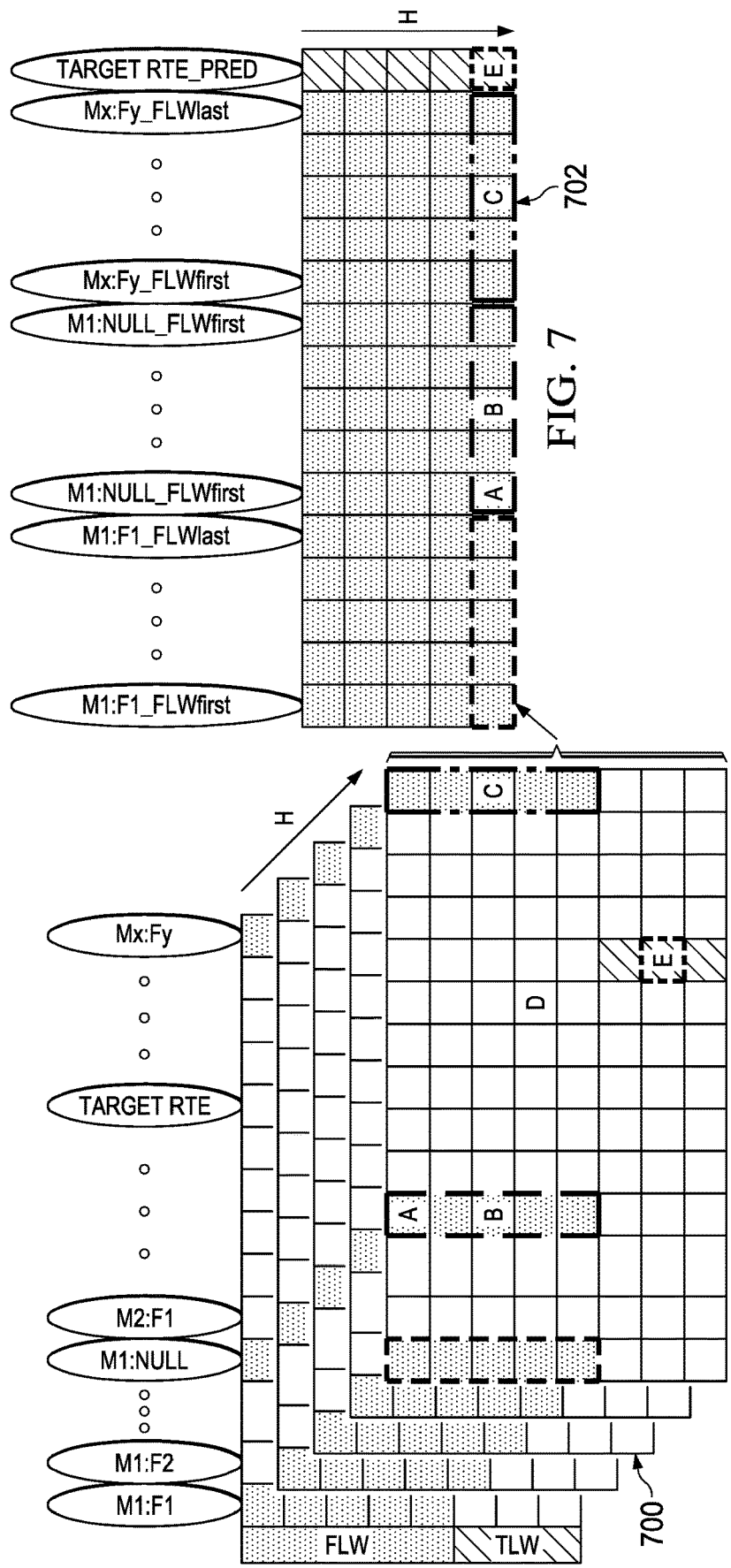
FIG. 7 is an illustration of an example of feature vector extraction in accordance with an illustrative embodiment.

Turning to FIG. 7, an illustration of an example of feature vector extraction is depicted in accordance with an illustrative embodiment. The objective of feature extraction is to represent each layer in a feature window cube 700 as a single feature vector and classifier target. For example, without limitation, the feature vector and classifier target may be represented by feature output table 702. The information in feature output table 702 may then be passed to a machine learning algorithm.

Feature vector extraction involves determining the relevant feature RTEs and uncorrelated MMSGs and extracting the feature information for each window. The feature vectors are then assembled into feature output table 702 for each aircraft, and data from across aircraft are compiled into a composite feature table. Feature window cube 700 is processed separately for each target RTE and prediction horizon, and each is used to train a single RTE classifier. At the end of this step, the system has generated an ensemble of classifiers, one for each prediction horizon and target RTE, that may be deployed to perform RTE prediction on new fault data.

Figure 8:
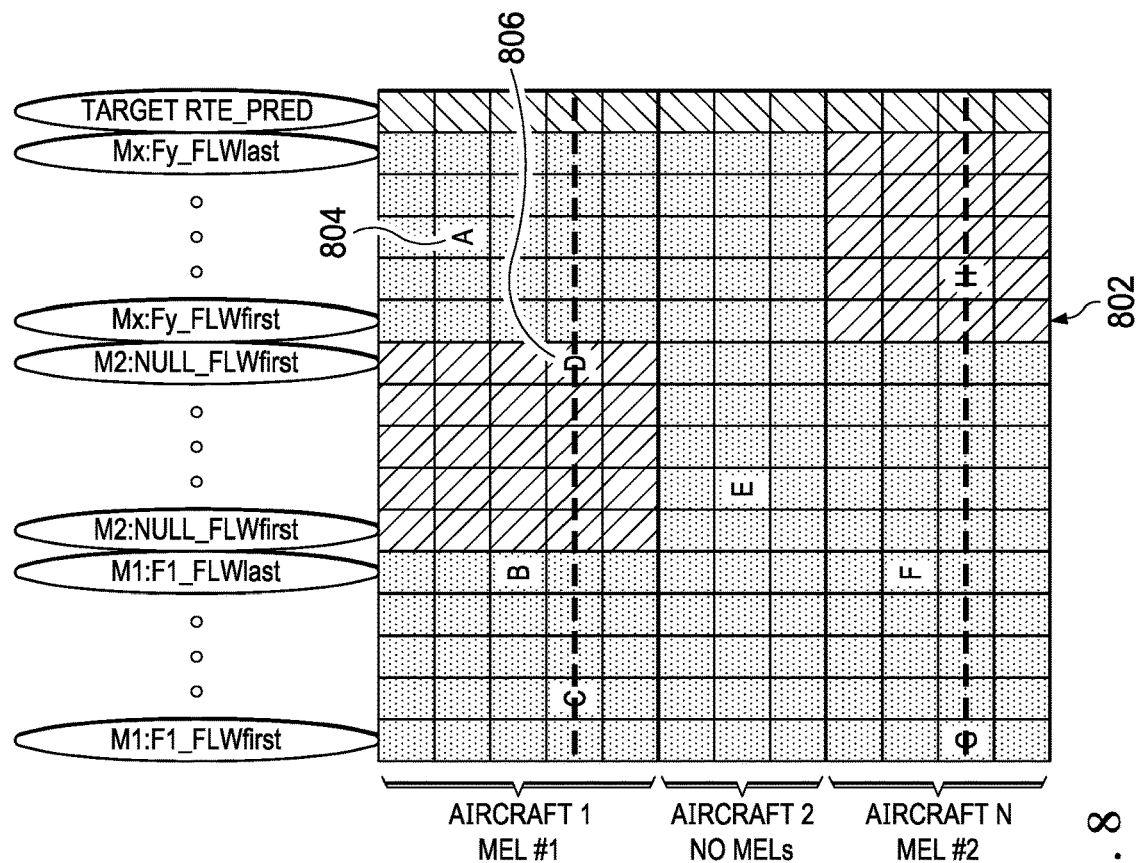
FIG. 8 is an illustration of an example of filtering feature vectors to remove feature vectors that are highly correlated with minimum equipment list actions in accordance with an illustrative embodiment.
Figure 8:
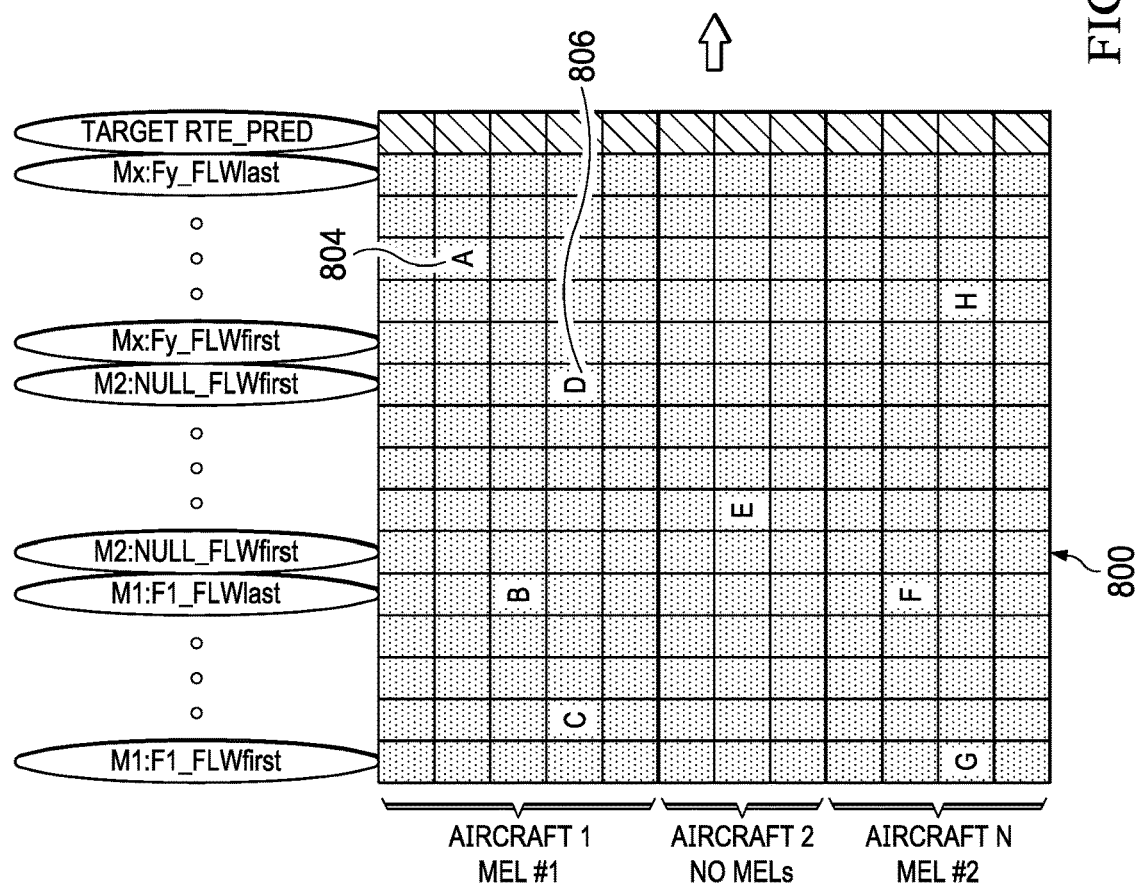

Turning to FIG. 8, an illustration of an example of filtering feature vectors to remove feature vectors that are highly correlated with minimum equipment list actions is depicted in accordance with an illustrative embodiment. Feature vectors are indicated by letters in feature output table 800. For example, feature vector 804 is indicated by the letter "A" in feature output table 800 and feature vector 806 is indicated by the letter "D" in feature output table 800.

The final step is to proceed through each of the feature vectors and remove those that coincide with one or more MELs and contain features that are highly-correlated with the MEL that overlap the feature window. For each MMSG and FDE in the feature space and the set of MELs that are known to coincide with the feature set, the set of rules between each MEL and MMSG/FDE is determined in the manner described above to gauge how correlated the MEL is to the fault. Those MMSGs and FDEs whose likelihood exceeds a given threshold are placed on a "no coincidence" list for filtering. Then for each feature vector, the system determines which flight legs in the feature window correlate with any MELs by aligning the date and time for each flight leg with the time window of the MEL and removing the feature vector if it contains any instance of a "no coincidence" MMSG or FDE during the MEL period.

Feature output table 802 shows the result of this process of applying the rules to feature table 800. In this example, the flight leg corresponding to feature vector 806 is found to correspond to a MEL period. Therefore, feature vector 806 will be removed and will not be used for maintenance message prediction.

Figure 9:
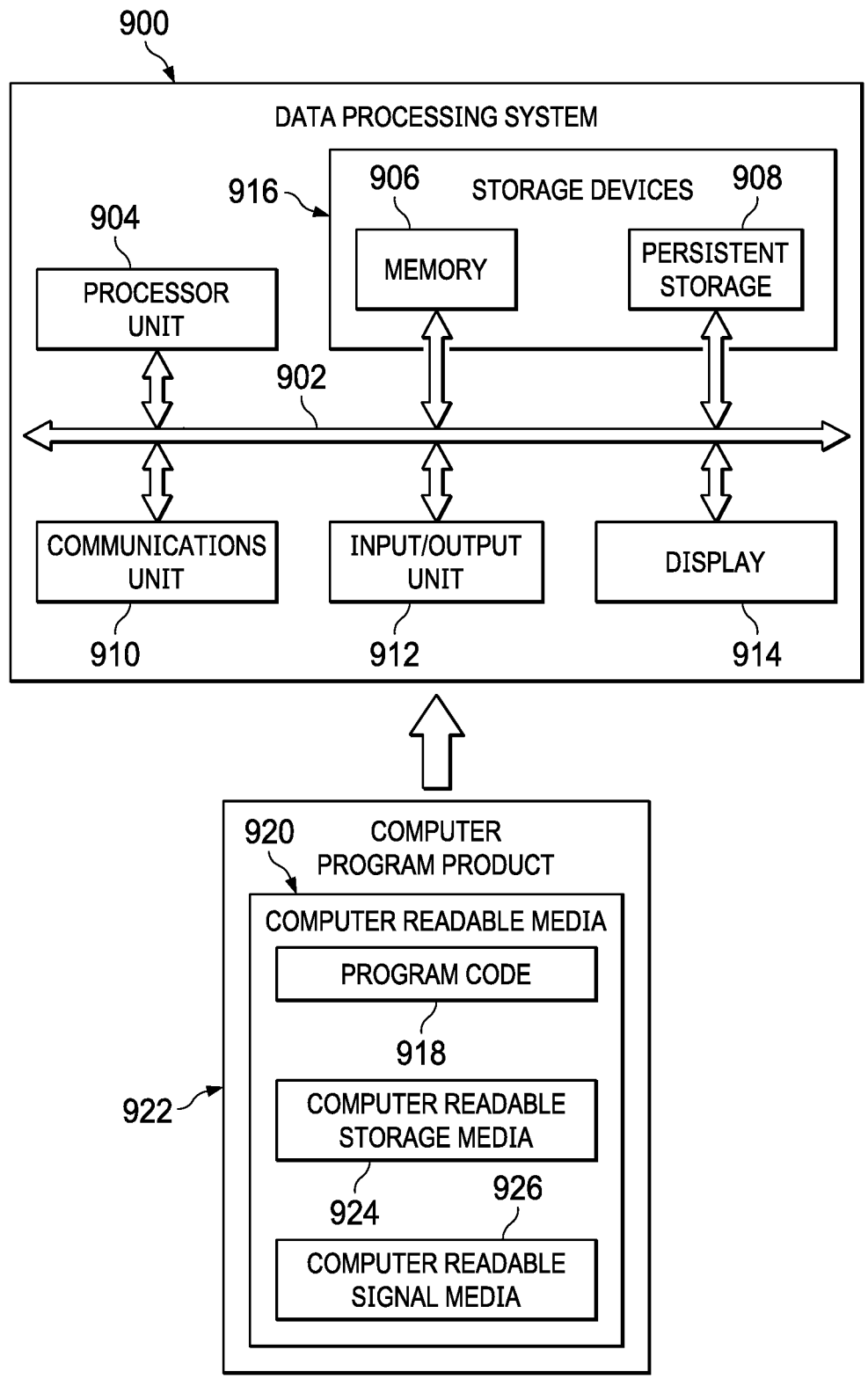
FIG. 9 is an illustration of a block diagram of a data processing system in accordance with an illustrative embodiment.

Turning now to FIG. 9, an illustration of a block diagram of a data processing system is depicted in accordance with an illustrative embodiment. In this example, data processing system 900 is an example of one implementation of a data processing system for implementing maintenance message predictor 102 in FIG. 1.

In this illustrative example, data processing system 900 includes communications fabric 902. Communications fabric 902 provides communications between processor unit 904, memory 906, persistent storage 908, communications unit 910, input/output (I/O) unit 912, and display 914. Memory 906, persistent storage 908, communications unit 910, input/output (I/O) unit 912, and display 914 are examples of resources accessible by processor unit 904 via communications fabric 902.

Processor unit 904 serves to run instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and other suitable information either on a temporary basis or a permanent basis. Storage devices 916 also may be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output (I/O) unit 912 allows for input and output of data with other devices that may be connected to data processing system 900. For example, input/output (I/O) unit 912 may provide a connection for user input through a keyboard, a mouse, and/or some other suitable input device. Further, input/output (I/O) unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program instructions, program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926.

Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code. As one example, data processing system 900 may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application-specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system.

Additionally, communications unit 910 may include a number of devices that transmit data, receive data, or both transmit and receive data. Communications unit 910 may be, for example, a modem or a network adapter, two network adapters, or some combination thereof. Further, a memory may be, for example, memory 906, or a cache, such as that found in an interface and memory controller hub that may be present in communications fabric 902.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of maintaining an aircraft, the method comprising:
one or more computing devices:
storing a plurality of maintenance messages generated during a plurality of legs of flights of the aircraft to form a plurality of stored maintenance messages;
filtering the plurality of stored maintenance messages to remove minimum-equipment-list-induced signals;
using machine learning to generate a predicted maintenance message based on the plurality of stored maintenance messages, wherein:
maintenance message data of the plurality of stored maintenance messages and flight deck effect data are employed from a number of previous flight legs to a current leg to produce the predicted maintenance message;
the predicted maintenance message comprises a prediction of a future occurrence of a maintenance message for the aircraft; and
the machine learning is applied after removal of the minimum-equipment-list-induced signals from the plurality of stored maintenance messages; and
providing the predicted maintenance message to a user device, whereby a maintenance operation is performed on the aircraft, the maintenance operation comprising proactive or preventative maintenance relating to the predicted maintenance message.

2. The method of claim 1, wherein storing the plurality of maintenance messages comprises storing the plurality of maintenance messages generated during a plurality of legs of flights of a plurality of aircraft including the aircraft.

3. The method of claim 1, further comprising generating a feature set comprising a number of stored maintenance messages of a plurality of aircraft.

4. The method of claim 3, further comprising extracting feature vectors from the feature set, wherein:
  filtering the stored maintenance messages further comprises removing from the feature vectors those of the feature vectors that are correlated to minimum equipment list actions, whereby filtered feature vectors are formed; and
  generating the predicted maintenance message comprises generating the predicted maintenance message from the filtered feature vectors by applying a machine learning algorithm to the filtered feature vectors, such that the machine learning algorithm does not train on feature vectors correlated to minimum equipment list actions.

5. The method of claim 4, wherein extraction of feature vectors comprises determining maintenance messages that are uncorrelated to feature real time events.

6. The method of claim 5, further comprising using a rule differentiation procedure to distinguish maintenance messages that are correlated to minimum equipment list actions and maintenance messages that are not correlated to minimum equipment list actions.

7. The method of claim 1, wherein generating the predicted maintenance message from the stored plurality of maintenance messages comprises applying a machine learning algorithm to the stored plurality of maintenance messages to train prediction of future events.

8. A method of maintaining a vehicle, the method comprising:
  one or more hardware processors implementing a maintenance predictor by:
    storing a plurality of maintenance messages generated during operation of the vehicle to form a plurality of stored maintenance messages;
    filtering the stored maintenance messages to remove from the stored maintenance messages those maintenance messages that are correlated to minimum equipment list actions, the filtering forming filtered stored maintenance messages;
    generating a predicted maintenance message based on the filtered stored maintenance messages by applying a machine learning algorithm to the filtered stored maintenance messages to train prediction of future maintenance message events for the vehicle, wherein:
      maintenance message data of the filtered stored maintenance messages and flight deck effect data are employed from a number of previous flight legs to a current leg to produce the predicted maintenance message;
      patterns of errors in the filtered stored maintenance messages and flight deck effects are evaluated to predict future real time events; and
      the machine learning algorithm is applied after removal of the maintenance messages that are correlated to minimum equipment list actions, such that the machine learning algorithm does not train on stored maintenance messages correlated to minimum equipment list actions; and
    facilitating a presentation of the predicted maintenance message for performing a maintenance operation on the vehicle, the maintenance operation comprising proactive or preventative maintenance relating to the predicted maintenance message.

9. The method of claim 8, wherein storing the plurality of maintenance messages comprises storing the plurality of maintenance messages generated by a plurality of vehicles including the vehicle.

10. The method of claim 8 further comprising:
  generating a feature set from the plurality of stored maintenance messages; and
  extracting feature vectors from the feature set, wherein:
    filtering the stored maintenance messages further comprises removing from the feature vectors those of the feature vectors that are correlated to minimum equipment list actions, whereby filtered feature vectors are formed; and
    generating the predicted maintenance message comprises generating the predicted maintenance message from the filtered feature vectors by applying a machine learning algorithm to the filtered feature vectors, such that the machine learning algorithm does not train on feature vectors correlated to minimum equipment list actions.

11. The method of claim 8, further comprising using a rule differentiation procedure to distinguish maintenance messages that are correlated to minimum equipment list actions from maintenance messages that are not correlated to minimum equipment list actions.

12. The method of claim 8, wherein the vehicle is an aircraft and storing the plurality of maintenance messages comprises storing the plurality of maintenance messages generated during a plurality of legs of flights of the aircraft to form the plurality of stored maintenance messages.

13. An apparatus, comprising:
  one or more processors implementing:
    a real-time event storage storing a plurality of maintenance messages generated by a vehicle during operation of the vehicle to form a plurality of stored maintenance messages;
    a maintenance predictor generating a predicted maintenance message based on the plurality of stored maintenance messages, wherein:
      patterns of errors in the plurality of the stored maintenance messages and flight deck effects are evaluated to predict future real time events;
      the predicted maintenance message comprises a prediction of a future occurrence of a maintenance message for the vehicle of the plurality of stored maintenance messages generated by the vehicle; and
      a machine learning algorithm is applied to the plurality of stored maintenance messages after minimum-equipment-list-induced signals have been removed from the plurality of stored maintenance messages, such that the machine learning algorithm is not trained with data correlated to minimum equipment list actions; and
    a predicted maintenance message deliverer sending the predicted maintenance message to a device associated with a maintenance personnel to facilitate performance of a maintenance operation on the vehicle.

14. The apparatus of claim 13, wherein the real-time event storage stores the plurality of maintenance messages comprising a plurality of maintenance messages generated during operation of a plurality of vehicles including the vehicle.

15. The apparatus of claim 13, further comprising a feature set generator generating a feature set from the plurality of stored maintenance messages.

16. The apparatus of claim 15, further comprising a feature vector extractor extracting feature vectors from the feature set, wherein:
   filtering the stored maintenance messages further comprises removing from the feature vectors those of the feature vectors that are correlated to minimum equipment list actions, whereby filtered feature vectors are formed; and
   generating the predicted maintenance message comprises generating the predicted maintenance message from the filtered feature vectors by applying a machine learning algorithm to the filtered feature vectors, such that the machine learning algorithm does not train on feature vectors correlated to minimum equipment list actions.

17. The apparatus of claim 15, further comprising a feature space filter filtering the stored maintenance messages to remove from the stored maintenance messages those of the stored maintenance messages that are correlated to minimum equipment list actions before the stored maintenance messages are used to generate the predicted maintenance message using the machine learning algorithm.

18. The apparatus of claim 17, further comprising a rule differentiator distinguishing the stored maintenance messages that are correlated to minimum equipment list actions from those of the stored maintenance messages that are not correlated to minimum equipment list actions.

19. The apparatus of claim 13, wherein the maintenance predictor is generating the predicted maintenance message from the plurality of stored maintenance messages by applying a machine learning algorithm to the plurality of stored maintenance messages to train prediction of future events.

20. The apparatus of claim 13, wherein the vehicle is an aircraft and wherein the real-time event storage stores a plurality of maintenance messages generated during a plurality of legs of flights of the aircraft to form the plurality of stored maintenance messages.

* * * * *